(12) United States Patent
Xu et al.

(10) Patent No.: US 9,384,590 B2
(45) Date of Patent: Jul. 5, 2016

(54) ESTIMATING TRAVEL TIMES THROUGH TRANSPORTATION STRUCTURES USING LOCATION TRACES

(71) Applicant: HERE Global B.V., Veldhoven (NL)

(72) Inventors: Bo Xu, Lisle, IL (US); Matei Nicolae Stroila, Chicago, IL (US); Jane Macfarlane, Oakland, CA (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/300,729

(22) Filed: Jun. 10, 2014

(65) Prior Publication Data

US 2015/0356771 A1    Dec. 10, 2015

(51) Int. Cl.
*G06T 17/30* (2006.01)
*G06T 11/20* (2006.01)
*G06T 15/40* (2011.01)

(52) U.S. Cl.
CPC .............. *G06T 17/30* (2013.01); *G06T 11/203* (2013.01); *G06T 15/405* (2013.01); *G06T 2210/12* (2013.01); *G06T 2210/21* (2013.01); *G06T 2210/32* (2013.01)

(58) Field of Classification Search
None
See application file for complete search history.

(56) References Cited

U.S. PATENT DOCUMENTS 8,145,367 B2 *  3/2012  Khatwa .................. G08G 5/025
                                                          701/120
8,566,016 B2 * 10/2013  Law ....................... G08G 5/065
                                                             701/1

OTHER PUBLICATIONS

Amin, S. et al.; "Mobile Century—Using GPS Mobile Phones as Traffic Sensors: A Field Experiment"; Proceedings of the 15th World Congress on ITS; New York; 2008; whole document (4 pages).
Ban, X. et al.; "Delay Pattern Estimation for Signalized Intersections Using Sampled Travel Times"; Transportation Research Record: Journal of the Transportation Research Board, No. 2130; 2009; p. 109-119.
U.S. Department of Transportation Federal Highway Administration; "Work Zone Performance Measurement Using Probe Data"; Publication No. FHWA-HOP-13-043; Sep. 2013; whole document (48 pages).
Hoh, B. et al.; Virtual Trip Lines for Distributed Privacy-Preserving Traffic Monitoring; Sixth Annual International Conference on Mobile Systems, Applications and Services (MobiSys 2008); Breckenridge, Colorado; 2008; whole document (14 pages).
Work, D. et al.; "An Ensemble Kalman Filtering Approach to Highway Traffic Estimation Using GPS Enabled Mobile-Devices"; Proceedings of the 47th IEEE Conference on Decision and Control; Cancun, Mexico; 2008; whole document (7 pages).
Liu, X. et al., *Intersection delay estimation from floating car data via principal curves: a case study on Beijing's road network*, Frontiers of Earth Science, 7(2) (2013) 206-216.

* cited by examiner

*Primary Examiner* — Said Broome
(74) *Attorney, Agent, or Firm* — Alston & Bird LLP

(57) ABSTRACT

A method, apparatus, computer program product, and device with various means are disclosed for determining the time it takes to a traverse a transportation structure by enclosing a representation of a transportation structure with a bounding polygon, specifying a plurality of gates which represent legitimate entry or exit points of the transportation structure as one or more edges of the bounding polygon, and computing the travel time for a probe traveling through the bounding polygon via the gates. Computing the probe's travel time comprises generating a location trace of movement of the probe, determining an entry and exit time, and calculating the difference between the exit time and the entry time. Determining the entry and exist time can be done by interpolation. An average of a set of computations can be used to get an average of the time it takes traverse the transportation structure.

8 Claims, 12 Drawing Sheets

(a) An intersection in real world.

(b) Computer representation of the intersection in (a). The thick line is the delay zone of roadway A.

(c) Bounding rectangle of roadway A.

(d) Union of bounding rectangles (shown by dashed line) forms the bounding polygon of the intersection.

ESTIMATING TRAVEL TIMES THROUGH TRANSPORTATION STRUCTURES USING LOCATION TRACES

TECHNICAL FIELD

This invention relates generally to transportation structures and, more specifically, to data analysis of vehicle traffic through those transportation structures.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

Currently, the performance of transportation structures, such as intersections, is evaluated by fixed sensors, such as loop detectors, ultra-sonic vehicle detectors, and cameras. These sensors are expensive to deploy and maintain. Furthermore, they usually cover a small portion of a transportation network such as select highway segments.

Another existing method to evaluate transportation structures is via microscopic traffic simulations. This method is usually used for cost-benefit analysis before a structure is built. This method needs reliable calibration of parameters such as traffic arrival rate, distribution of turns, traffic flow rules, and car following rules. These parameters are usually difficult to calibrate.

Recently there have been studies on analyzing intersection delays using location traces, and another body of work defines the boundary of a transportation structure using virtual trip lines (VTL). As described in more detail below, each of these has problems that could be improved upon.

SUMMARY

This section contains examples of possible implementations and is not meant to be limiting.

Various aspects of examples of the invention are set out in the claims.

According to a first aspect of the present invention, an exemplary apparatus includes one or more processors and one or more memories including computer program code. The one or more memories and the computer program code are configured, with the one or more processors, to cause the apparatus to perform at least the following: enclosing a representation of a transportation structure with a bounding polygon; specifying a plurality of gates, wherein a gate comprises one or more edges of the bounding polygon that represent a legitimate entry point or exit point of the transportation structure; and computing a travel time for a probe traveling through the bounding polygon via the gates.

According to a second aspect of the present invention, a method comprises enclosing a representation of a transportation structure with a bounding polygon; specifying a plurality of gates, wherein a gate comprises one or more edges of the bounding polygon that represent a legitimate entry point or exit point of the transportation structure; and computing a travel time for a probe traveling through the bounding polygon via the gates.

According to a third aspect of the present invention, an exemplary computer program product includes a non-transitory computer-readable storage medium bearing computer program code embodied therein for use with a computer. The computer program code includes instructions to control or carry out enclosing a representation of a transportation structure with a bounding polygon; specifying a plurality of gates, wherein a gate comprises one or more edges of the bounding polygon that represent a legitimate entry point or exit point of the transportation structure; and computing a travel time for a probe traveling through the bounding polygon via the gates.

According to a fourth aspect of the present invention, an exemplary device has means for enclosing a representation of a transportation structure with a bounding polygon; means for specifying a plurality of gates, wherein a gate comprises one or more edges of the bounding polygon that represent a legitimate entry point or exit point of the transportation structure; and means for computing a travel time for a probe traveling through the bounding polygon via the gates.

DETAILED DESCRIPTION OF THE DRAWINGS

As briefly indicated above, there have been studies on analyzing intersection delays using location traces, and another body of work defines the boundary of a transportation structure using virtual trip lines (VTL), and there are problems with these techniques that are described herein.

Recently, there have been studies on analyzing intersection delays using location traces. A location trace is a sequence $(x_1,y_1,t_1), (x_2,y_2,t_2), \ldots (x_n,y_n,t_n)$, indicating that a vehicle is at position $(x_1,y_1)$ at time $t_1$, at position $(x_2,y_2)$ at time $t_2$, and so on. A vehicle that contributes its location traces is called a probe. The authors in the following reference use location traces to estimate intersection traffic delays in Beijing: Xiliang Liu, Feng Lu, Hengcai Zhang, Peiyuan Qiu, "Intersection delay estimation from floating car data via principal curves: a case study on Beijing's road network", Frontiers of Earth Science, 7(2):206-216, 2013.

Figure 1:
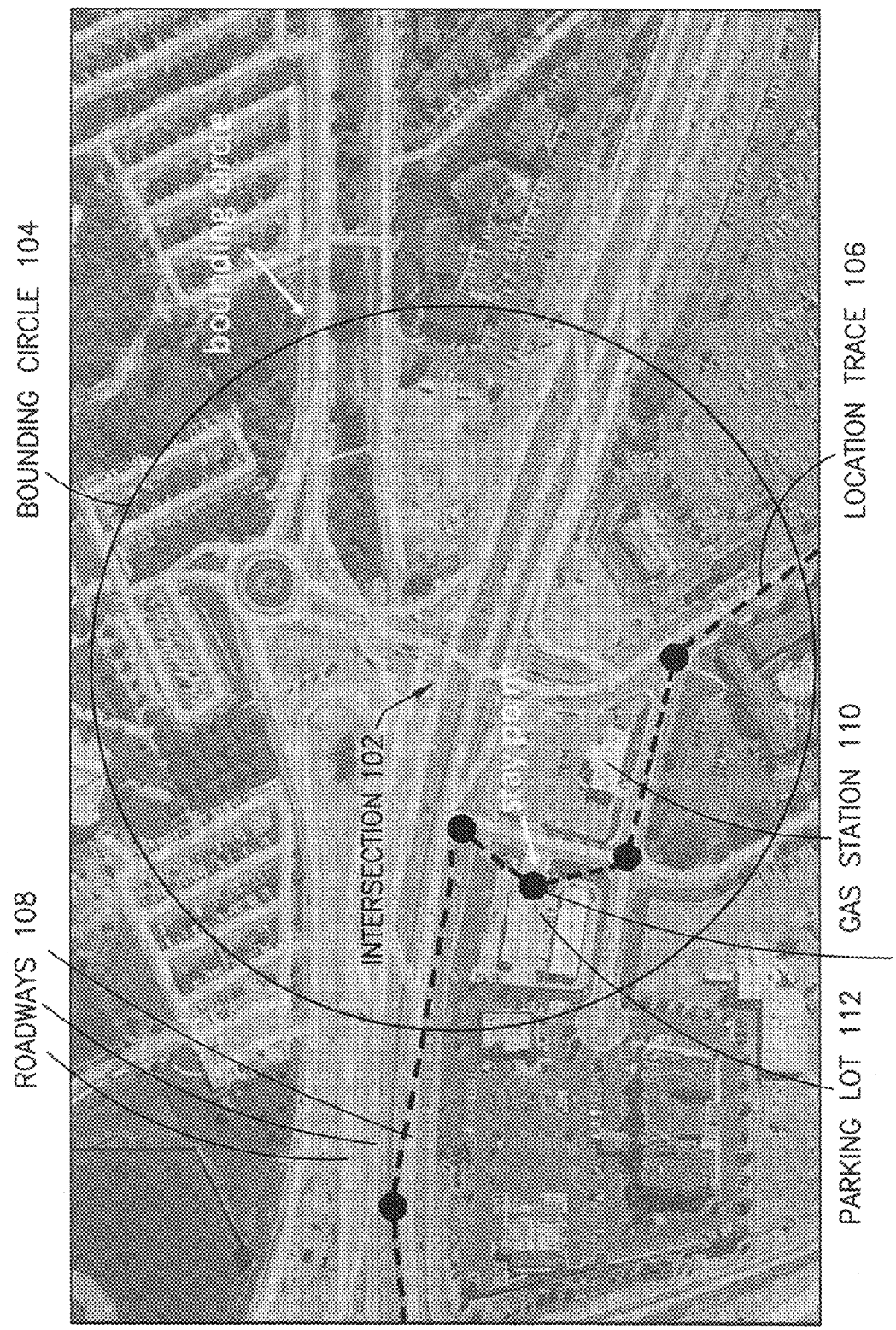
FIG. 1 is a diagram representing location trace method using a circle.

FIG. 1 depicts an aerial view of a transportation structure and surrounding buildings, roadways, parking lots, etc. Superimposed on this transportation structure is a representation of the work of the reference noted in the previous paragraph, showing an intersection 102, with a plurality of roadways 108, and the boundary of an intersection defined as a circle 104 centered at the center of the intersection 102. Through this transportation structure passes a probe that has a location trace 106. A possible disadvantage of this treatment is that the circle may enclose areas that do not belong to the intersection 102. For example, the circle may enclose facilities such as gas station 110, parking lot 112, or other structures or areas that are not part of the transportation structure. In this case, a probe may stay inside the boundary but outside the intersection for a long period of time, which could be called a "stay point", shown in FIG. 1. The location trace 106 remains for a period of time stopped at stay point 114. The tune the probe stays at the stay point could be counted into the intersection delay, which may make the analysis inaccurate.

Figure 2:
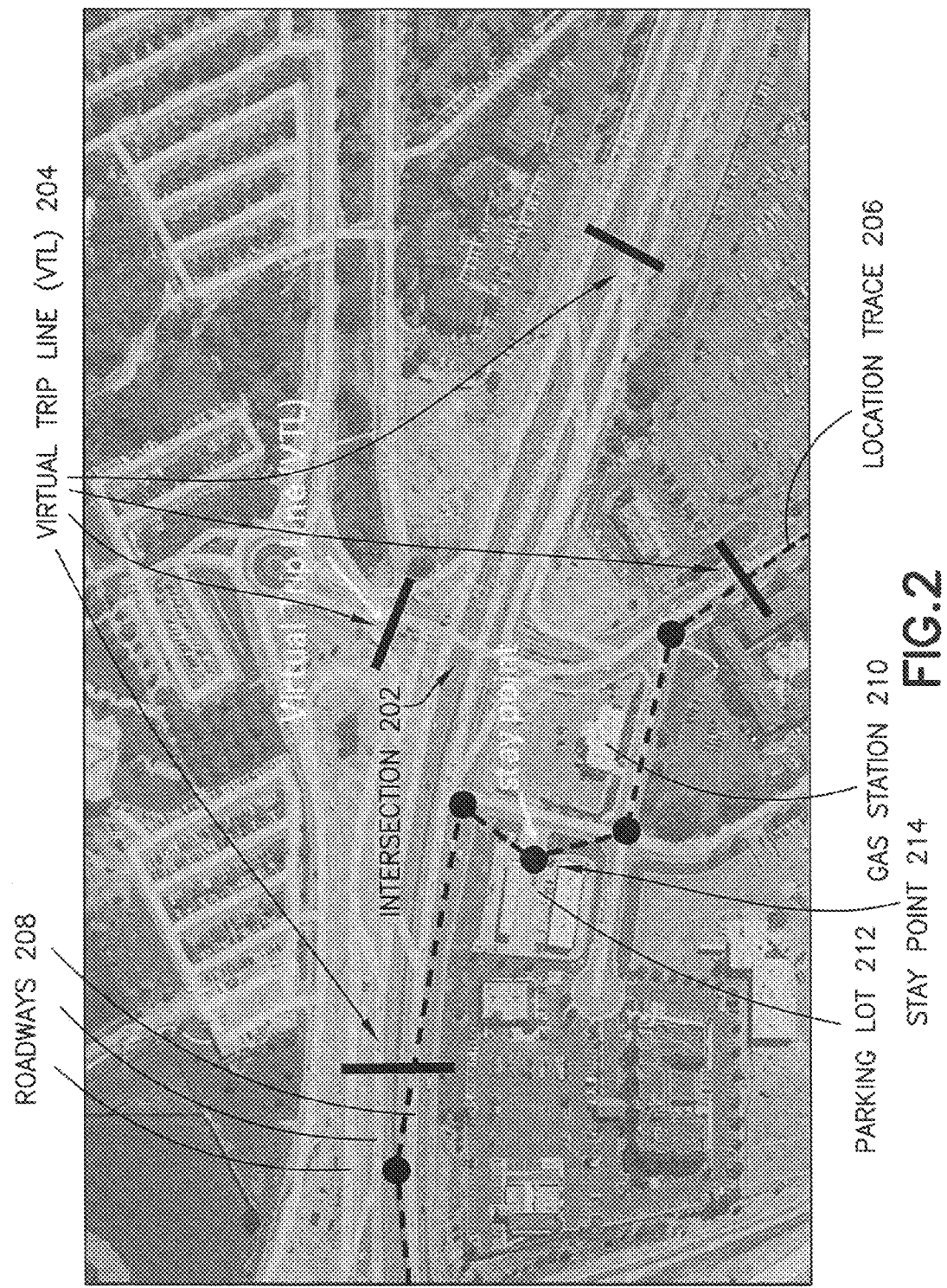
FIG. 2 is a diagram representing VTL method.

FIG. 2 shows another body of work which defines the boundary of a transportation structure using virtual trip lines (VTL). These references include the following: X. Ban, R. Herring, P. Hao, A. Bayen, "Delay Pattern Estimation for Signalized Intersections Using Sampled Travel Times", Transportation Research Record: Journal of the Transportation Research Board, No. 2130, pp. 109-119, 2009; S. Amin, et al., "Mobile Century—Using GPS Mobile Phones as Traffic Sensors: A Field Experiment", Proc., 15th World Congress on ITS, New York, 2008; D. Work, O. P. Tossavainen, S. Blandin, A. Bayen, T. Iwuchukwu, and K. Tracton, "An Ensemble Kalman-Filtering Approach to Highway Traffic Estimation Using GPS-Enabled Mobile Devices", Proc., 47th IEEE Conference on Decision and Control, Cancun, Mexico, 2008; and B. Hoh, M. Gruteser, R. Herring, J. Ban, D. Work, J. C. Herrera, and A. Bayen, "Virtual Trip Lines for Distributed Privacy-Preserving Traffic Monitoring", Sixth Annual International Conference on Mobile Systems, Applications and Services (MobiSys 2008), Breckenridge, Colo., 2008.

As shown in FIG. 2, which depicts the same aerial view as FIG. 1, a transportation structure is shown with surrounding buildings, roadways, parking lots, etc. Superimposed on this transportation structure is a representation of the work of the reference noted in the previous paragraph, showing an intersection 202, with a plurality of roadways 208. Through this transportation structure passes a probe that has a location trace 206. Virtual trip lines 204 are artificial line segments crossing a road. When a probe passes a VTL 204, it records the time at which the VTL 204 is passed. The travel time of the transportation structure is computed as the length of the time period since a vehicle passes one VTL 204 until it passes another VTL 204.

The VTL approach shares the same problem as the Location Trace approach described earlier herein in that the approach may falsely include travel times that are spent outside the transportation structure. Specifically, after a vehicle passes a VTL, it may move off the road, stay outside the transportation structure, and then exit at another VTL. This time is falsely counted into the delay. Thus the sections bounded by VTLs may enclose areas that do not belong to the intersection 202. For example, they may enclose facilities such as gas station 210, parking lot 212, or other structures or areas not part of the transportation structure. In this case, a probe may stay inside the boundary but outside the intersection for a long period of time, which could be called a "stay point", shown in FIG. 2, and identified as stay point 214.

"Work Zone Performance Measurement Using Probe Data", Publication No. FHWA-HOP-13-043 of the Office of Operations of the Federal Highway Administration, U.S. Department of Transportation, September 2013, is a reference which discusses another process that uses location traces to estimate work zone traffic delays. However, the method described therein does not use location traces directly. Instead, it uses link-based travel times report by TMC (Traffic Message Channel) which are aggregated from location traces. However, such Link-based travel times do not capture delays vehicles spend at intersections.

An exemplary embodiment of this invention disclosed herein provides a method that uses location traces to estimate the average time a vehicle spends on traveling through a transportation structure such as an intersection. For an intersection, this method further computes the delay which is the average time the vehicle spends on traveling through the intersection beyond what it would have spent under a free-flow traffic condition. The method is able to breakdown the delay into turn movements. The method may be used to evaluate the performance of a transportation structure. It may also be used to evaluate the benefit of a transportation project by comparing the performance before the advent of the project and that after the project. It may also be used to improve route planning by taking into account the costs of making turns.

A location trace is a sequence $(x_1,y_1,t_1)$, $(x_2,y_2,t_2)$, ... $(x_n,y_n,t_n)$, indicating that a vehicle is at position $(x_1,y_1)$ at time $t_1$, at position $(x_2,y_2)$ at time $t_2$, and so on. Each $(x_i,y_i,t_i)$ is called a location point. A vehicle or device that moves through the transportation structure that contributes its location traces is called a probe. Location traces may be collected from taxis, trucks, cellphone users, computers, mobile devices, devices mounted on or carried by people or vehicles, or other sources. A transportation structure is a set of possibly interconnected transportation facilities such as highways, roadways, bridges, bicycle paths, footpaths, etc. Each transportation facility can be represented or modeled in a computer or some mathematical representation as a polyline or spline with certain width or other geometric attributes.

A free-flow traffic condition is a condition in which a driver is able to travel freely at a speed close to the design speed of a road. For an intersection, a free-flow traffic condition implies that there are no traffic signals to decelerate or stop the vehicle.

A turn movement is a connection of a pair of roads that are joined by an intersection. For example, a left turn is a turn movement, and so are a right turn and a through movement.

Figure 3:
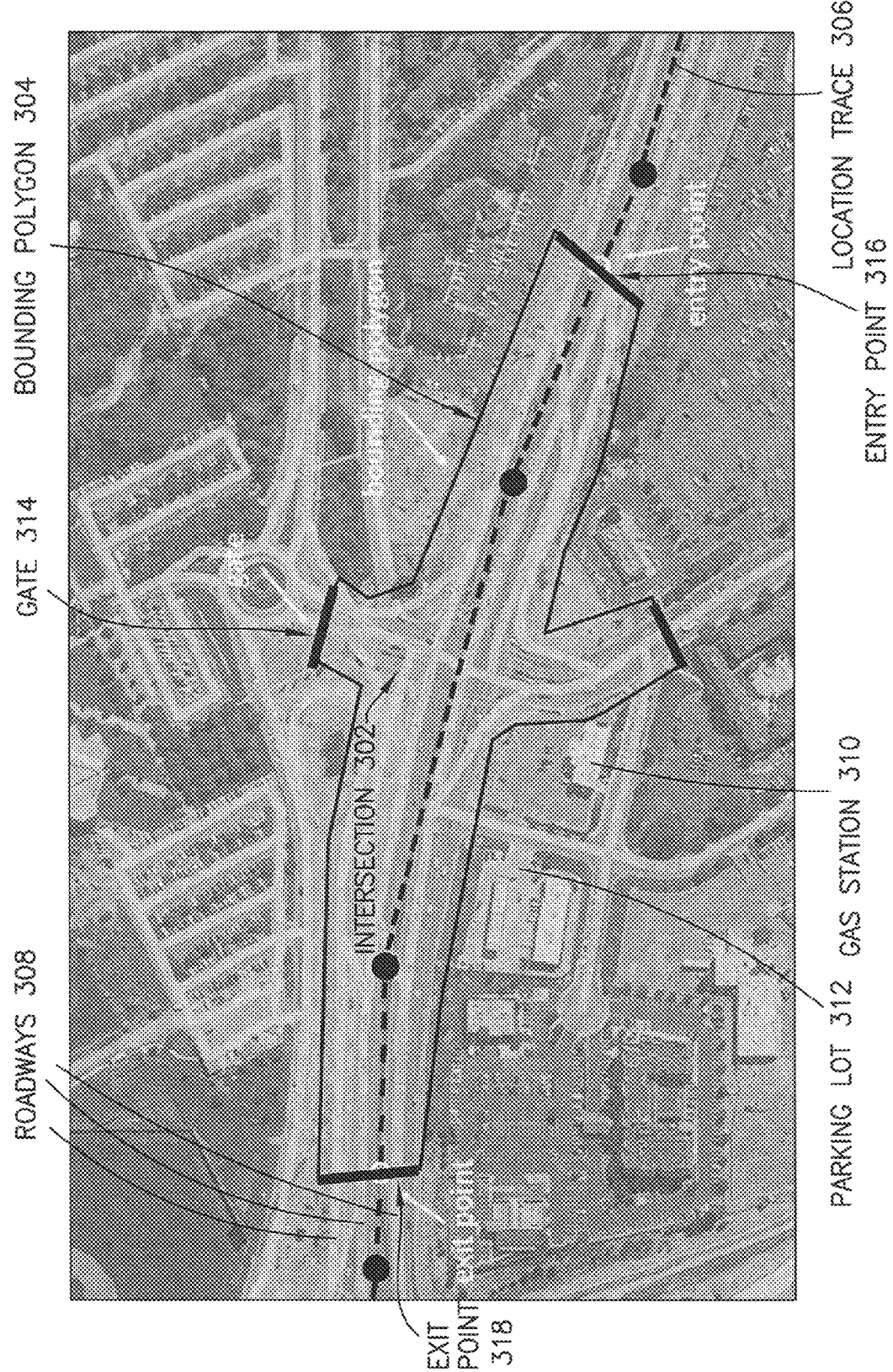
FIG. 3 is a diagram representing an embodiment of this invention.

FIG. 3 illustrates an embodiment of this invention, where a method comprises (i) designating a polygon called bounding polygon that encloses a studied transportation structure; (ii) designating certain edges of the bounding polygon, referred to as gates, that contain all legitimate entry points and exit points of the studied transportation structure; and (iii) computing the travel time that probes spend on traveling through the bounding polygon via the gates. Given a set of travels times, an average travel time can be calculated.

FIG. 3, which depicts the same aerial view as in FIG. 1 and FIG. 2, shows a transportation structure and surrounding buildings, roadways, parking lots, etc. Superimposed on this transportation structure is a representation of the work of this invention. The transportation structure comprises an intersection 302, with a plurality of roadways 308. Through this transportation structure passes a probe that has a location trace 306. The bounding polygon 304 surrounds the transportation structure.

Note, though, that the bounding polygon 304 does not enclose areas that do not belong to the intersection 302. For example, they do not enclose facilities such as gas station 310, parking lot 312, or other structures or areas not part of the transportation structure. In this case, the problem of a stay point, discussed earlier, is avoided.

When a probe passes a gate 314, it is within the polygon 304. The gate which the probe enters the polygon 304 corresponds to a legitimate access point to the intersection 302. FIG. 3 shows the probe entering via entry gate 316 and exiting the polygon via exit gate 318, which corresponds to a legitimate access point to the intersection 302.

Note that in discussing creating the bounding polygon, that polygon does not enclose the actual, physical, real world structure. Rather, some sort of mathematical or computer generated representation, model, or construct is developed with inputs taken from the real world structure. The bounding polygon is then created to surround that representation. It is only shorthand to refer to the bounding polygon to surround the transportation structure itself. Likewise, legitimate entry and exit points are those access points in the actual physical transportation structure that are permitted for access to the transportation structure. The gates are aspects of the representation of those legitimate points in the transportation structure representation.

Figure 10:
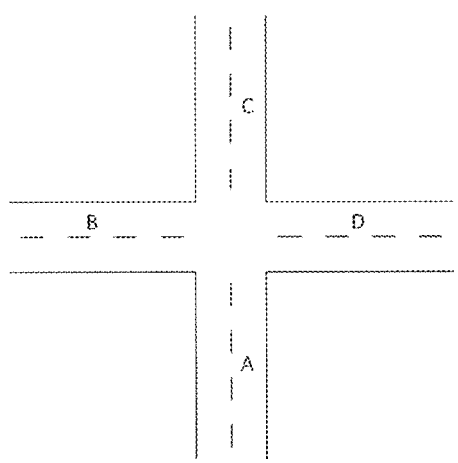
FIG. 10 is an example of creating bounding polygon for an intersection.
Figure 10:
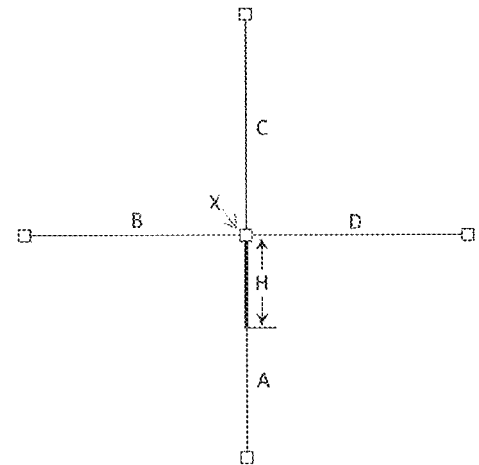
Figure 10:
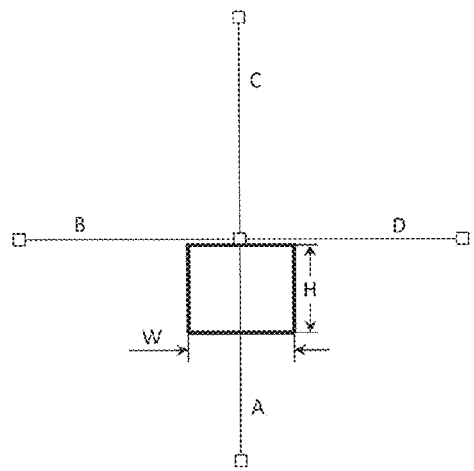
Figure 10:
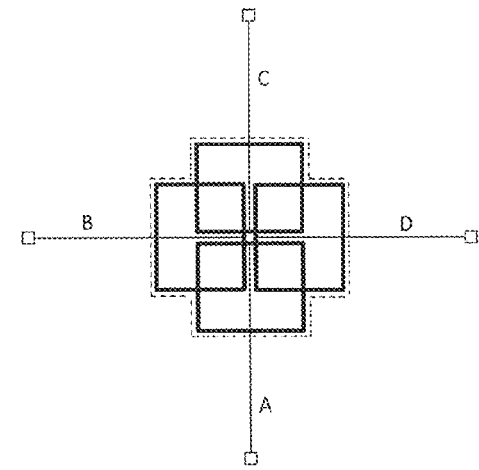
Figure 11:
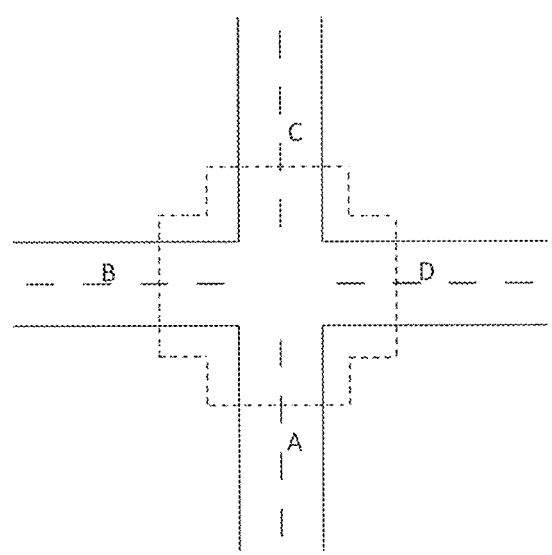
FIG. 11 shows how the bounding polygon looks like when overlaid on the geometry of the intersection.

An exemplary method of creating or designating a bounding polygon of an intersection can be done automatically as follows and as shown in FIG. 10 and the result in FIG. 11.

First, the intersection, denoted X, is represented by a node that connects multiple line segments wherein each line segment is the center line of a roadway, see FIG. 10(a) for an illustration.

Second, for each roadway Y that is connected by the intersection, find the section of Y that starts at a distance H from X and ends at X. This section is referred to as the delay zone of Y. The thick line in FIG. 10(b) shows the delay zone of roadway A. Intuitively, the delay zone of Y represents the section in which vehicles decelerate or stop upon red light when passing X from Y. The length of the delay zone, i.e. H, can be set to an estimated maximum queue length when vehicles pass X from Y.

Third, for each roadway Y, extend its delay zone laterally by a width W. This extension forms a rectangle with Y as its centerline, H as its height, and W as its width. This rectangle is referred to as the bounding rectangle of Y. FIG. 10(c) shows the bounding rectangle of roadway A. Intuitively, the bounding rectangle of Y represents the area that a probe point may fall into when probes move within the delay zone. The width of the bounding rectangle, i.e. W, depends on the number of lanes, lane widths, and size of positioning errors. Let m be the number of lanes, L be the width of each lane, and R be the standard deviation of positioning errors. W can be set to $$W = m \cdot L + 4R$$

The justification of the above equation is as follows. Assume that the positioning error follows a normal distribution with standard deviation equal to R, then the probability that a probe point falls into the bounding rectangle defined by H and W when a probe moves within the delay zone is more than 95%.

And last, compute the union of the bounding rectangles created for all roadways connected by X as shown in FIG. 10(d). The result is the bounding polygon of the intersection X as shown in FIG. 11.

Returning to the discussion of the embodiment of this invention as illustrated in FIG. 3, in the case where the structure is an intersection, the method of an embodiment of the invention further computes the average travel time for through traffic, left turn traffic, right turn traffic, respectively. By comparing the average travel time with the travel time under a free-flow traffic condition, the method of this embodiment of the invention also computes the delay for each turn movement.

This exemplary embodiment of this invention computes the average travel time in a transportation structure in the following steps.

A bounding polygon is specified to enclose the transportation structure. The bounding polygon should cover the geometry of the transportation structure. It could be said that the polygon should tightly bound the polygon such that it encloses the representation of the transportation structure as closely as possible. However, the polygon cannot be too close to the structure because the movement of the probe within the structure might have errors. For instance, if the probe is getting its location from a satellite in orbit and the satellite has a margin of error of a few meters or yards, it could put the probe outside of the polygon bounding the transportation structure if the polygon is too close to the edge because the location information could put the probe outside of that edge. Such an error could be caused by a GPS or some other error factor. Thus, the bounding polygon should have some extent or margin of error to accommodate location errors. This extent could also be the width of the line drawing the edge of the polygon. The polygon itself could have this factor or margin of error built into the polygon or it could create an error itself. Thus, this extent could cover GPS error, cover the structure completely, cover the boundary of the polygon, and/or cover some other error, such that the bounding polygon should cover the representation of the transportation structure tightly except for a margin of error built in as an extension.

As noted earlier, FIG. 3 shows a bounding polygon 304 for an intersection 302.

A set of gates are specified. A gate 314 consists of one or more edges of the polygon 304. A gate usually crosses a road segment, composed of roadways 308.

For each location trace 306, compute the time a probe spends on traveling through the transportation structure.

Figure 12:
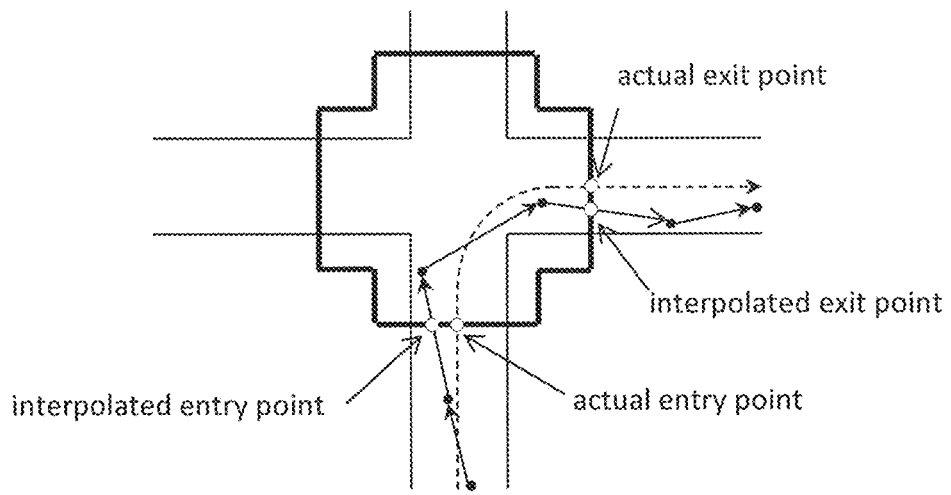
FIG. 12 shows computing entry points and exit points by interpolation.

Compute the first intersection point between the location trace 306 and a gate by interpolation. Designate this point as an entry point 316. Observe that due to positioning errors, the entry point may not necessarily be the actual point at which the probe enters the gate. This is illustrated in FIG. 12. FIG. 12 shows computing entry points and exit points by interpolation. The dashed line represents an actual trace of a probe. The solid arrowed polyline represents a location trace collected from the same probe; each solid circle represents a probe point. The thick line represents the bounding polygon.

Compute the time at which the probe arrives at the entry point which can be done by interpolation. Designate this time as an entry time.

Note that interpolation refers to a recovery of the probe's movement between two consecutive location points in the location trace. In one embodiment, interpolation is linear. That is, the probe is assumed to have moved at a constant velocity vector. In another embodiment, interpolation follows a constant acceleration, wherein the acceleration is determined based on the speed difference at each location point. There may be other forms of interpolation to recover the probe's movement.

Compute the next intersection point between the location trace 306 and a gate, which can be done by interpolation. Designate this intersection point as an exit point 318. Compute the time at which the probe arrives at the exit point, which can be done by interpolation. Designate this time as an exit time. If the exit point does not exist and cannot be computed by interpolation, then do not compute travel time for this location trace.

In other words, since the structure of the transportation structure would be known, the valid entry and exit points would be known. This means that the gates are fixed and predetermined. Data for when the probe moves through a particular physical point may not be known exactly. If data comes from some source such that the data does not provide an exact point when the probe passed through a particular gate, then interpolation would be needed. On the other hand, if the probe and gate are somehow interconnected by signals such that when the probe passes the gate the exact moment is recorded, then interpolation would not be needed. However, interpolation might still prove useful in the latter situation to get a more accurate fix. If two data points for the location of the probe do not coincide with the exact data point of the gate, from the trajectory it might be possible to draw a line between the two data points of the probe's movement and do an interpolation. Since the location trace is likely a set of data of locations at point at time intervals, interpolation, whether linear or by some other method, will likely be necessary.

Compute the travel time of the probe which is the difference between the exit time and the entry time.

Computing the average travel time by averaging the travel time among all location traces. Note that if an entry point or exit point does not exist for a particular location trace and cannot be computed by interpolation, but the travel time for that particular probe trace was determined, that travel time would be excluded from the averaging.

Figure 4:
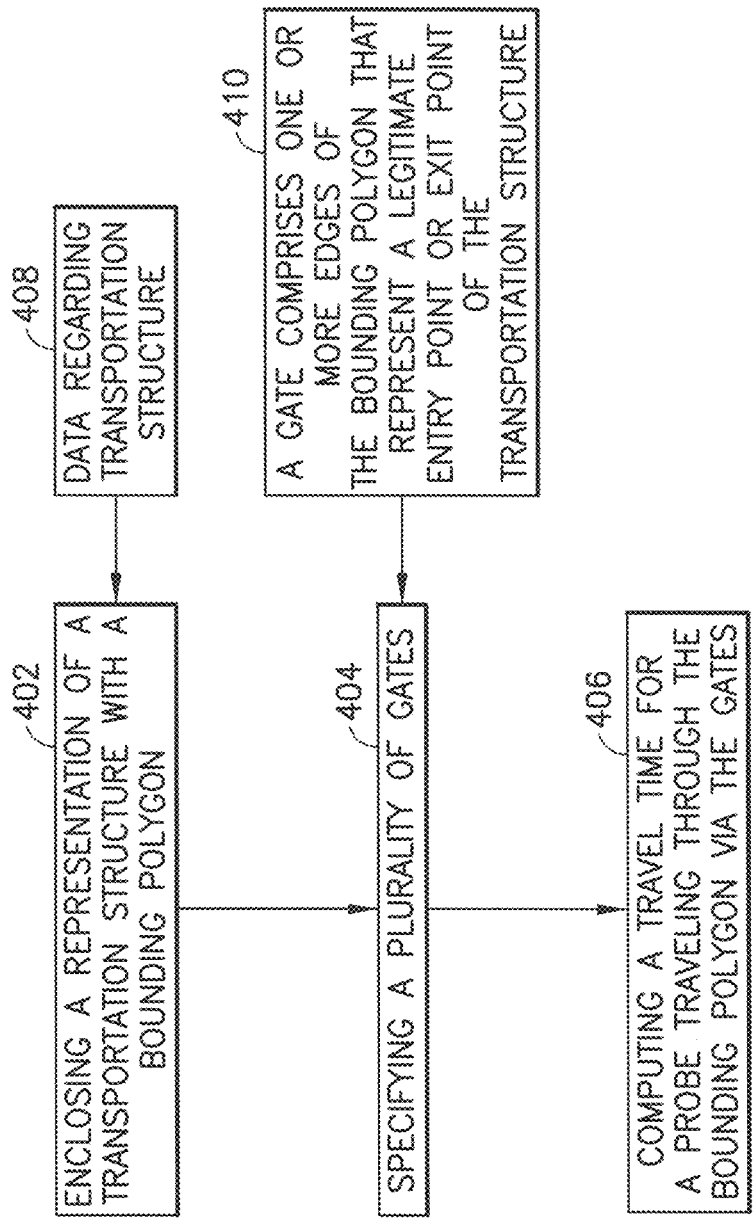
FIG. 4 is a logic flow diagram illustrating the operation of an exemplary method, a result of execution of computer program instructions embodied on a computer readable memory, and/or functions performed by logic implemented in hardware, in accordance with exemplary embodiments.

FIG. 4 is a logic flow diagram illustrating the operation of an exemplary method, a result of execution of computer program instructions embodied on a computer readable memory, and/or functions performed by logic implemented in hardware, in accordance with exemplary embodiments.

The method comprises enclosing a representation of a transportation structure with a bounding polygon 402; specifying a plurality of gates 404; and computing a travel time for a probe traveling through the bounding polygon via the gates 406. Data regarding the transportation structure has to be collected in order to create the representation of the transportation structure 408. Information regarding gates also has to be entered such that a gate comprises one or more edges of the bounding polygon that represent a legitimate entry point or exit point of the transportation structure 410.

Figure 5:
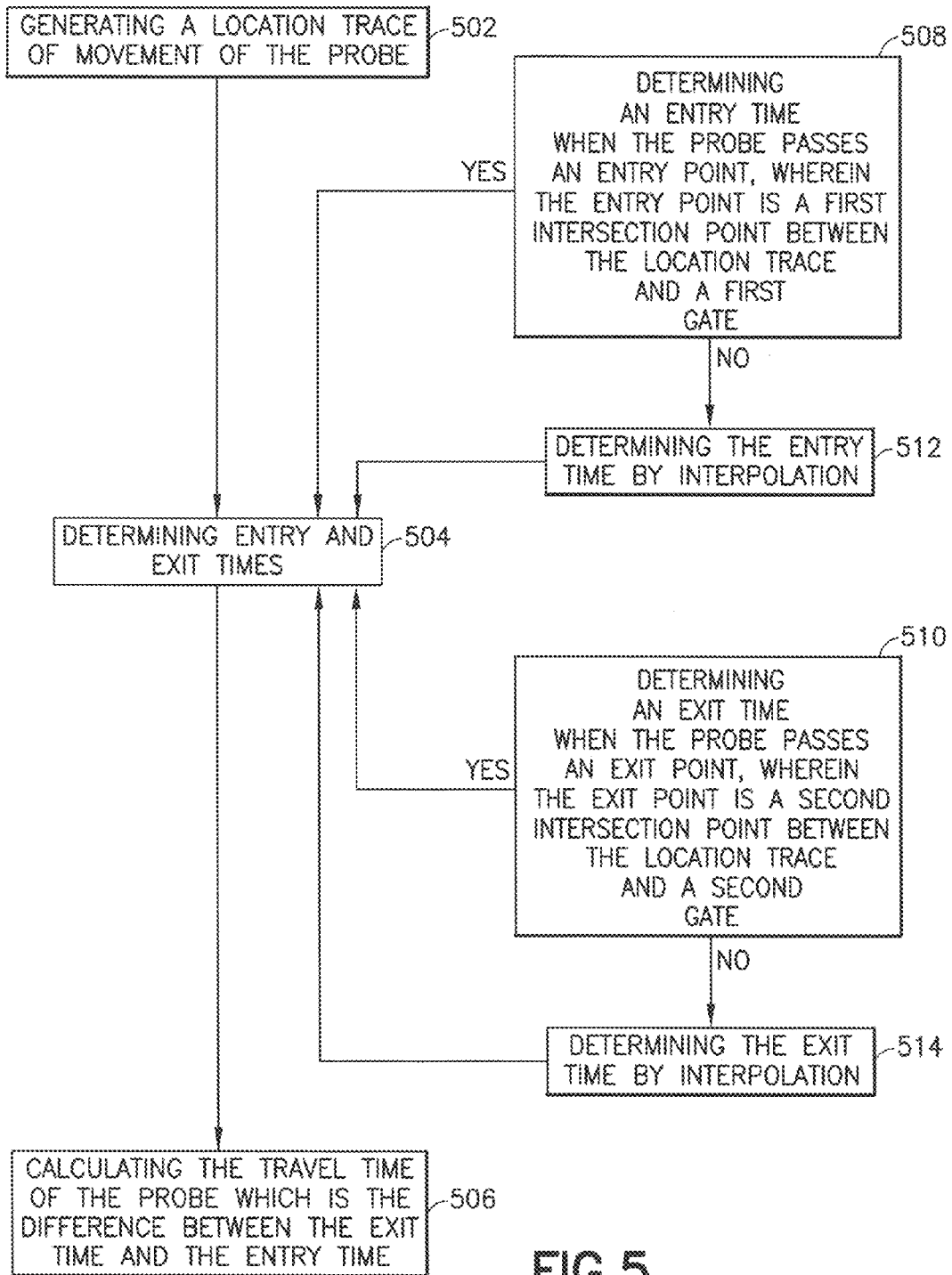
FIG. 5 is a logic flow diagram illustrating the operation of another aspect of an exemplary method, a result of execution of computer program instructions embodied on a computer readable memory, and/or functions performed by logic implemented in hardware, in accordance with exemplary embodiments.

FIG. 5 is a logic flow diagram illustrating the operation of another aspect of an exemplary method, a result of execution of computer program instructions embodied on a computer readable memory, and/or functions performed by logic implemented in hardware, in accordance with exemplary embodiments.

In an exemplary embodiment thereof, the computing of the travel time for the probe comprises generating a location trace of movement of the probe 502; determining an entry and exit time 504; and calculating the travel time of the probe which is the difference between the exit time and the entry time 506. To determine the entry time, which is the time when the probe passes an entry point, the entry point is a first intersection point between the location trace and a first gate 508. To determine an exit time when the probe passes an exit point, the exit point is a second intersection point between the location trace and a second gate 510. If there is no data point for the location trace at the moment that it passes the through the first gate give or take some acceptable margin, then the first intersection point would be arrived at or established by interpolation 512. In a further embodiment if there is no data point for the location trace at the moment that it passes the through the second gate, give or take some acceptable margin, then the first intersection point would be arrived at or established by interpolation 514.

Figure 6:
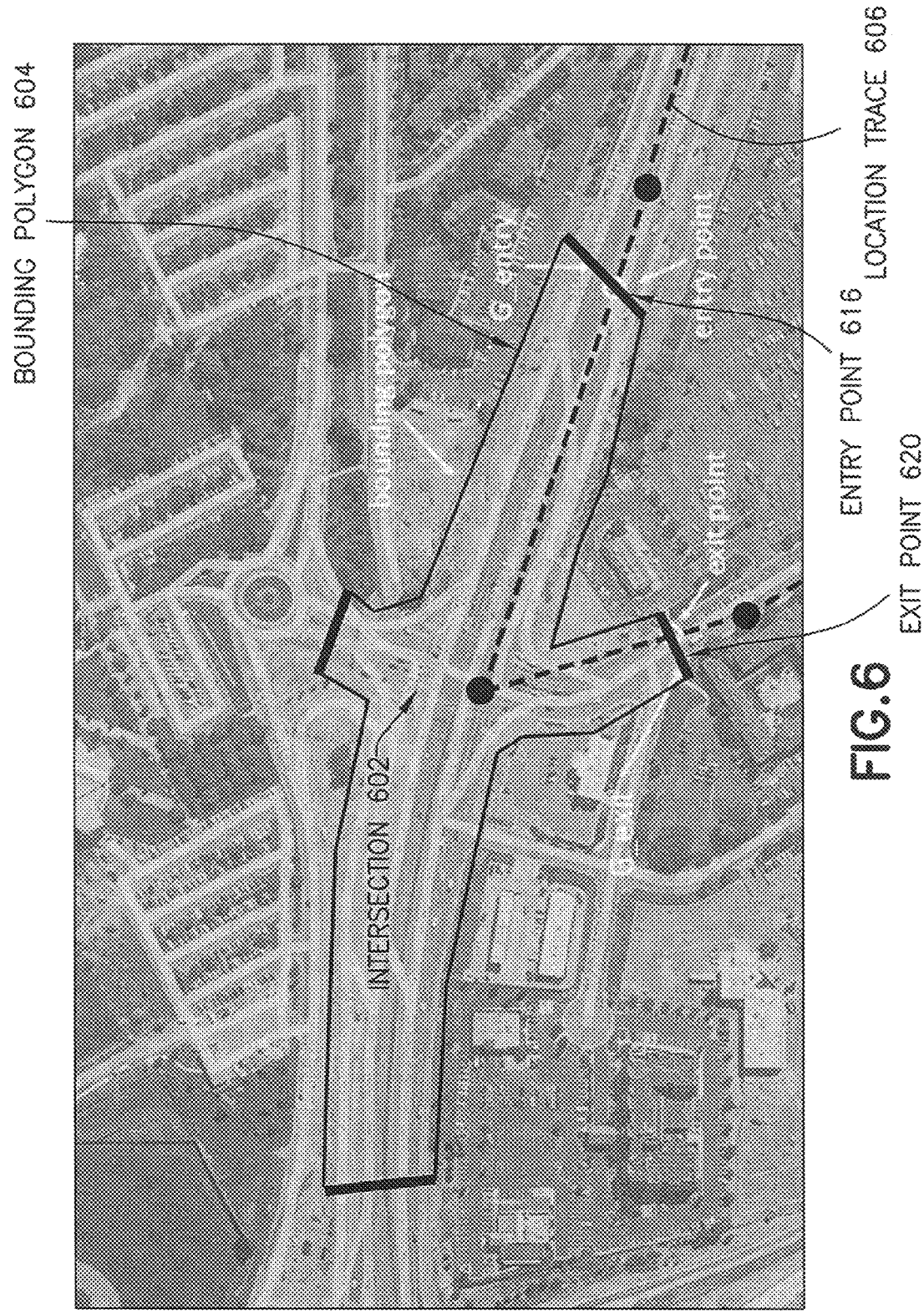
FIG. 6 is a diagram representing another embodiments of this invention.

FIG. 6 illustrates a variant on the above method. The same aerial representation of the transportation structure show intersection 602 which the probe passes through shown with bounding polygon 604 location trace 606. In this variant, the average travel time for a specific turn movement is computed. For this purpose, a pair of gates (G_entry, G_exit) needs to be specified which restricts that a location trace must enter at G_entry 616 and exit at G_exit 620 in order for its travel time to be counted toward the average travel time. The procedure for this variant is described as follows.

A bounding polygon is specified to enclose the transportation structure.

A pair of gates (G_entry, G_exit) are specified for the studied turn movement.

For each location trace, compute the time the probe spends on traveling through the turn movement as follows:

Compute the first intersection point between the location trace and the G_entry gate. Designate this point as an "entry point". Compute the time at which the probe arrives at the entry point by interpolation. Designate this time as an "entry time". If the entry point does not exist or cannot be determined by interpolation, then do not compute travel time for this location trace.

Compute the next intersection point between the location trace and the bounding polygon. If the intersection point exists and is located at the G_exit gate, designate this intersection point as an "exit point". Compute the time at which the probe arrives at the exit point by interpolation. Designate this time as an "exit time". If the intersection point does not exist or cannot be determined by interpolation or it exists but does not locate at the G_exit gate, then do not compute travel time for this location trace. By not exiting at G_exit, it could mean that the probe could have exited at a different gate than selected for this exemplary embodiment and thus would not be included because such a probe would not be making the selected turn.

Compute the travel time of the probe which is the difference between the exit time and the entry time.

Computing the average travel time by averaging the travel time among all location traces.

Figure 7:
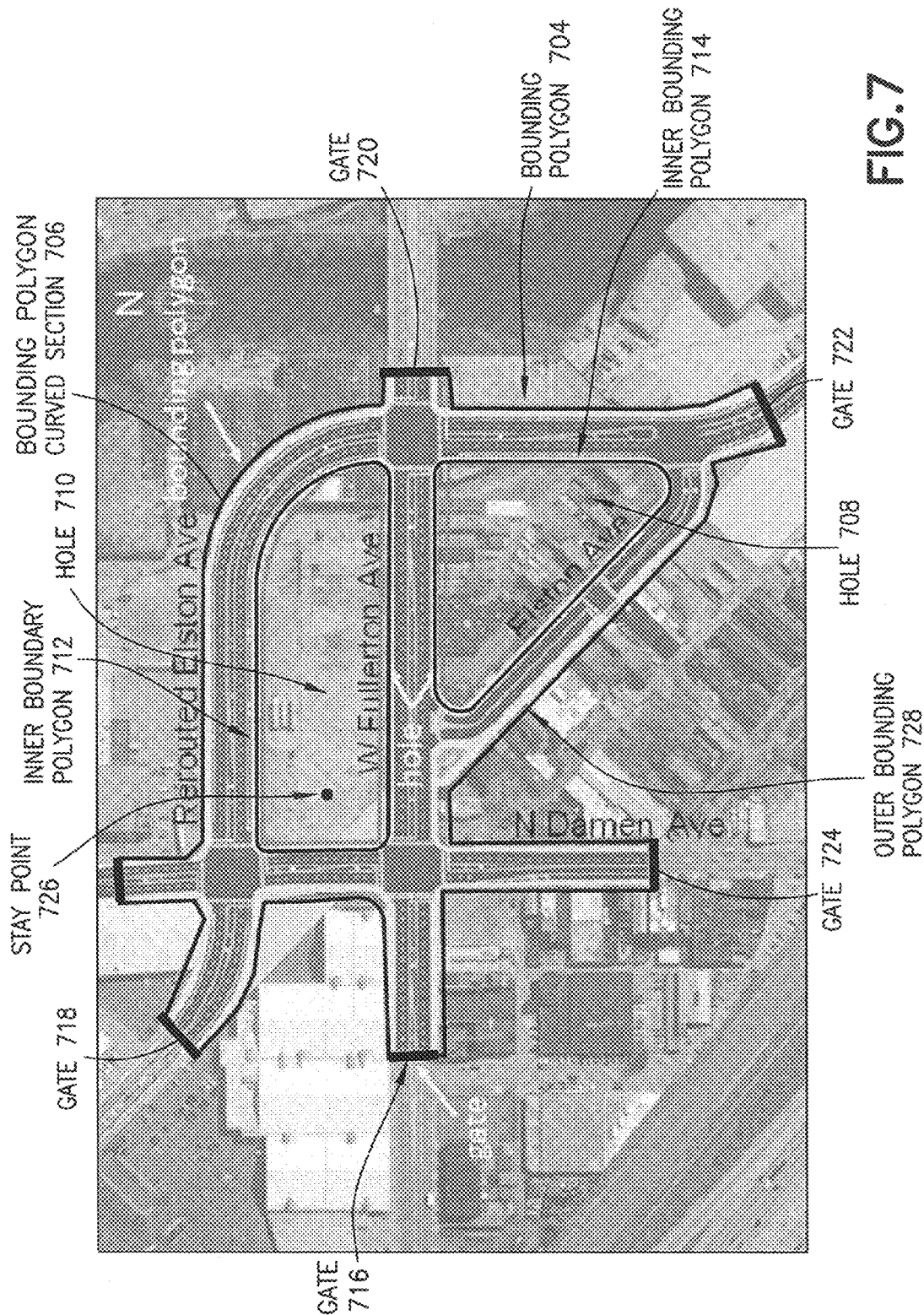
FIG. 7 is a diagram representing yet another embodiments of this invention.

FIG. 7 illustrates another variant of the method. In this variant, FIG. 7 uses a different aerial representation, the bounding polygon 704 contains holes 708 and 710. The holes exclude the areas for which travel times are not to be counted. The previously described procedures carry over to this variant without any modifications. The polygon has gates 716, 718, 720, 722, and 724. Inside hole 708 there could be stay point 726. By using the invention disclosed herein, the polygon will have an inner boundary 712 which would ensure that the time spent at the stay point 726 could be excluded from computations. Hole 710 is also excluded by means of inner bounding polygon 714. What was typically thought of as the bounding polygon 704 would have both inner bounding polygon 714 and outer bounding polygon 728 components.

In another variant, also shown in FIG. 7, one or more edges of the bounding polygon are curves 706 as opposed to straight lines.

Non-limiting examples of subjects that this exemplary embodiment of this invention relates to are the following: delay analysis applications for transportation structures such as intersections and bridges; benefit evaluation applications for transportation projects; traffic analysis applications; work/construction zone performance evaluation; road intersection delay analysis; routable maps, trip/route planning; route planning with turn costs; navigation systems; probe data; location traces; gps traces; and floating car data.

Non-limiting examples of potential users of this exemplary embodiment of this invention include the following: transportation agencies; transportation consulting companies; routable map producers; trip/route planning service providers; fleet management; and any users who are interested in knowing the expected travel time that is needed to pass a transportation structure.

For one non-limiting example, a transportation agency could use this exemplary embodiment of this invention to evaluate the benefit of an intersection improvement project. For this purpose, the agency computes the average delay of the intersection using one year of location traces collected before the project started and the average delay of the intersection using one year of location traces collected after the project was completed. The reduction of the average delay after the project was completed indicates a benefit of the project.

As another non-limiting example, a route/trip planning service provider could use this exemplary embodiment of this invention to estimate turn delays at each intersection in a road network. Turn delays are incorporated in route/trip planning to increase the reliability of routes.

Compared to the sensor based solution, this exemplary embodiment of this invention saves the cost of deploying and maintaining sensors.

Compared to the first reference mentioned in this disclosure using a location trace method, this exemplary embodiment of this invention uses a bounding polygon instead of a circle as the boundary of an intersection. The bounding polygon encloses the intersection. Furthermore, this exemplary embodiment of this invention uses gates to restrict legitimate entry points and exit points. These measures ensure that only the travel times that are spent on traveling the intersection are counted toward the average travel time. Thus, the average travel time computed by this exemplary embodiment of this invention is more accurate than that computed by the location trace method with a circle used by the first reference mentioned in this disclosure.

Figure 8:
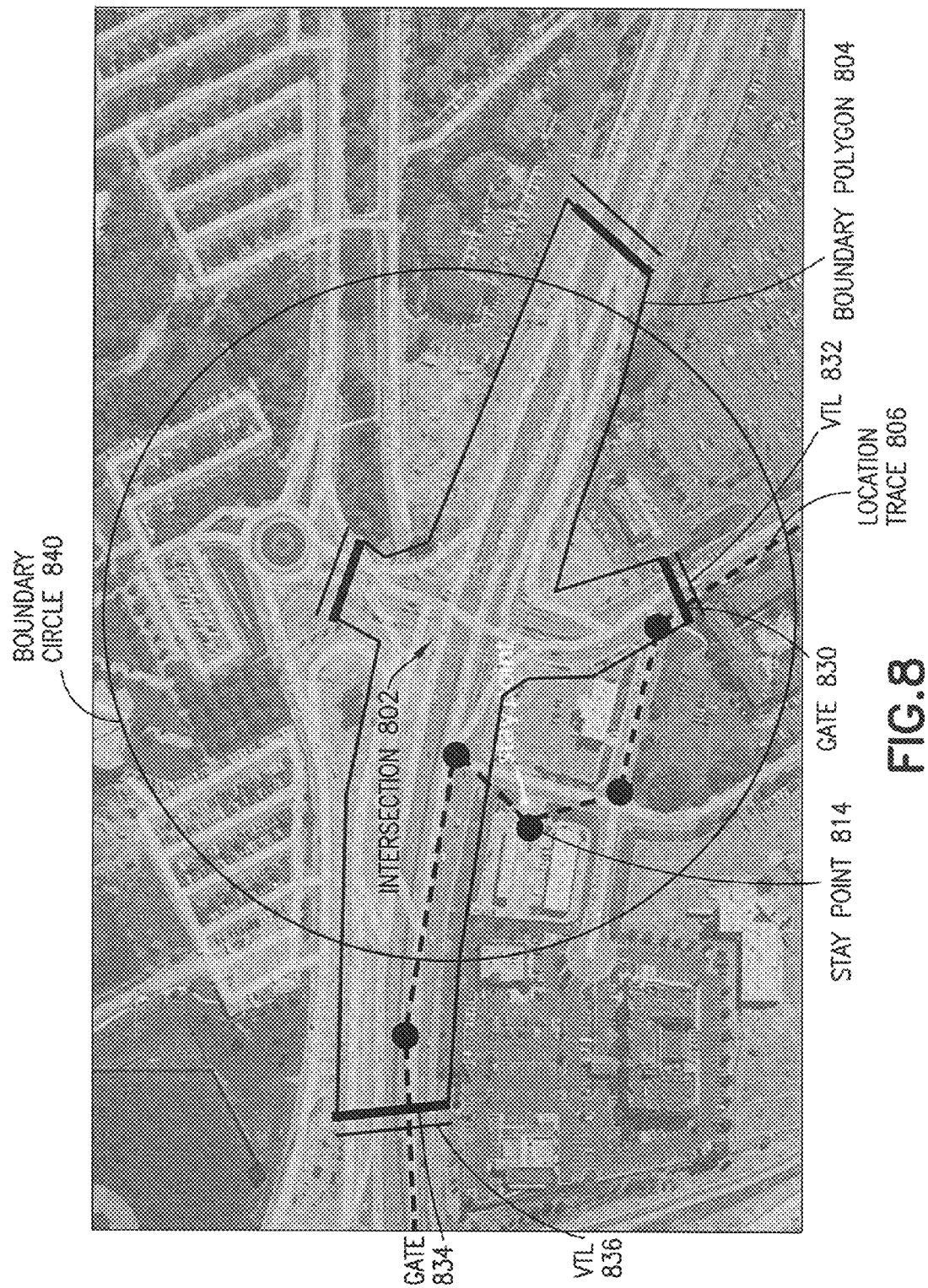
FIG. 8 is a diagram representing comparison to embodiment of this invention.

FIG. 8 shows a comparison example of the current exemplary embodiment of this invention to the location trace with circle method and the VTL method. In this figure, using the same aerial representation as earlier, intersection 802 has bounding polygon 804 with location trace 806 running through gate 834 and out of gate 830 but also shows the earlier work of the bounding circle 840. The stay point 814 falls into the circle boundary 840 and thus will be falsely counted toward travel time using approach of the location trace method with a circle. It falls outside the polygon boundary and thus will not be counted toward travel time using this exemplary embodiment of this invention.

Also shown in FIG. 8 are VTL lines 832 and 836, where the location trace passes VTL. 836 and exits VTL 832. Compared to the virtual trip line (VTL) approach described earlier, this exemplary embodiment of this invention uses a bounding polygon 804 to enclose an intersection 802. Thus, travel times spent outside the intersection are not counted toward the intersection delay. However as can be seen from FIG. 8, the VTL approach may falsely count travel times spent outside the intersection, such as at stay point 814, as discussed earlier.

Thus, in this comparison example of the current invention to the VTL approach, the probe stays at the stay point 814 while it travels between two gates. The VTL approach will count the stay time at the stay point 814 toward the intersection delay but this invention will not do so. This invention will discard the probe data because the stay point is outside the intersection structure.

Another difference between the current invention and the VTL approach is that the VTL approach requires that a participating vehicle knows about the VTLs and generates reports when passing a VTL. Our approach is not burdened with such a requirement; we can compute VTL passing times by interpolation.

Compared to the Link-based method referenced earlier, this invention is able to compute the travel time for turn movements, whereas the Link-based method can only compute the travel time for a road segment or a part of a road segment.

An exemplary embodiment of this invention would be characterized by a method comprising enclosing a representation of a transportation structure with a bounding polygon, specifying a plurality of gates, and computing a travel time for a probe traveling through the bounding polygon via the gates, wherein a gate comprises one or more edges of the bounding polygon that represent a legitimate entry point or exit point of the transportation structure.

In an exemplary embodiment of this invention, the bounding polygon can have an inner and outer boundary. Such an embodiment is shown in the situation where there are holes in the transportation structure and such holes could have stay points. In order to eliminate these holes, the polygon would wrap on the inside boundary of the representation of the transportation structure.

In an exemplary embodiment of this invention, the computing of the travel time for the probe comprises generating a location trace of movement of the probe; determining an entry time when the probe passes an entry point, wherein the entry point is a first intersection point between the location trace and a first gate; determining an exit time when the probe passes an exit point, wherein the exit point is a second intersection point between the location trace and a second gate; and calculating the travel time of the probe which is the difference between the exit time and the entry time.

In a further embodiment if there is no data point for the location trace at the moment that it passes the through the first gate give or take some acceptable margin, then the first intersection point would be arrived at or established by interpolation. In a further embodiment if there is no data point for the location trace at the moment that it passes the through the second gate, give or take some acceptable margin, then the first intersection point would be arrived at or established by interpolation.

Averaging a set of travel times can yield interesting data on the transportation structure. Averaging the travel times produces usable results when the averages represent a particular path. Thus, an exemplary embodiment would be to average a set of travel times. In another embodiment, a set comprises only those travel times wherein either (i) the entry point exists or can be determined by interpolation and (ii) the exit point exists or can be determined by interpolation. In a further embodiment the set is restricted to only travel times using a preselected first gate and a preselected second gate. Such an embodiment could be used to measure the time it takes to make a turn or follow a particular path through a transportation structure.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer readable media. In the context of this document, a "computer readable medium" may be any media or means that can contain, store, communicate, propagate or transport the instructions for use by or in connection with an instruction execution system, apparatus, or device, such as a computer, with one example of a computer described and depicted for example in FIG. 9 or where an apparatus comprises at least one processor and at least one memory including computer program code, wherein the at least one memory and the computer code are configured to, with the at least one processor, cause the apparatus to at least perform enclosing a representation of a transportation structure with a bounding polygon, specifying a plurality of gates, and computing a travel time for a probe traveling through the bounding polygon via the gates, where a gate comprises one or more edges of the bounding polygon that represent a legitimate entry point or exit point of the transportation structure.

A computer readable medium may comprise a computer readable storage medium (e.g., memory(ies) or other device) that may be any media or means that can contain or store the instructions for use by or in connection with an instruction execution system, apparatus, or device, such as a computer. A computer readable storage medium does not, however, encompass propagating signals. A computer readable medium could be part of a computer program product.

Figure 9:
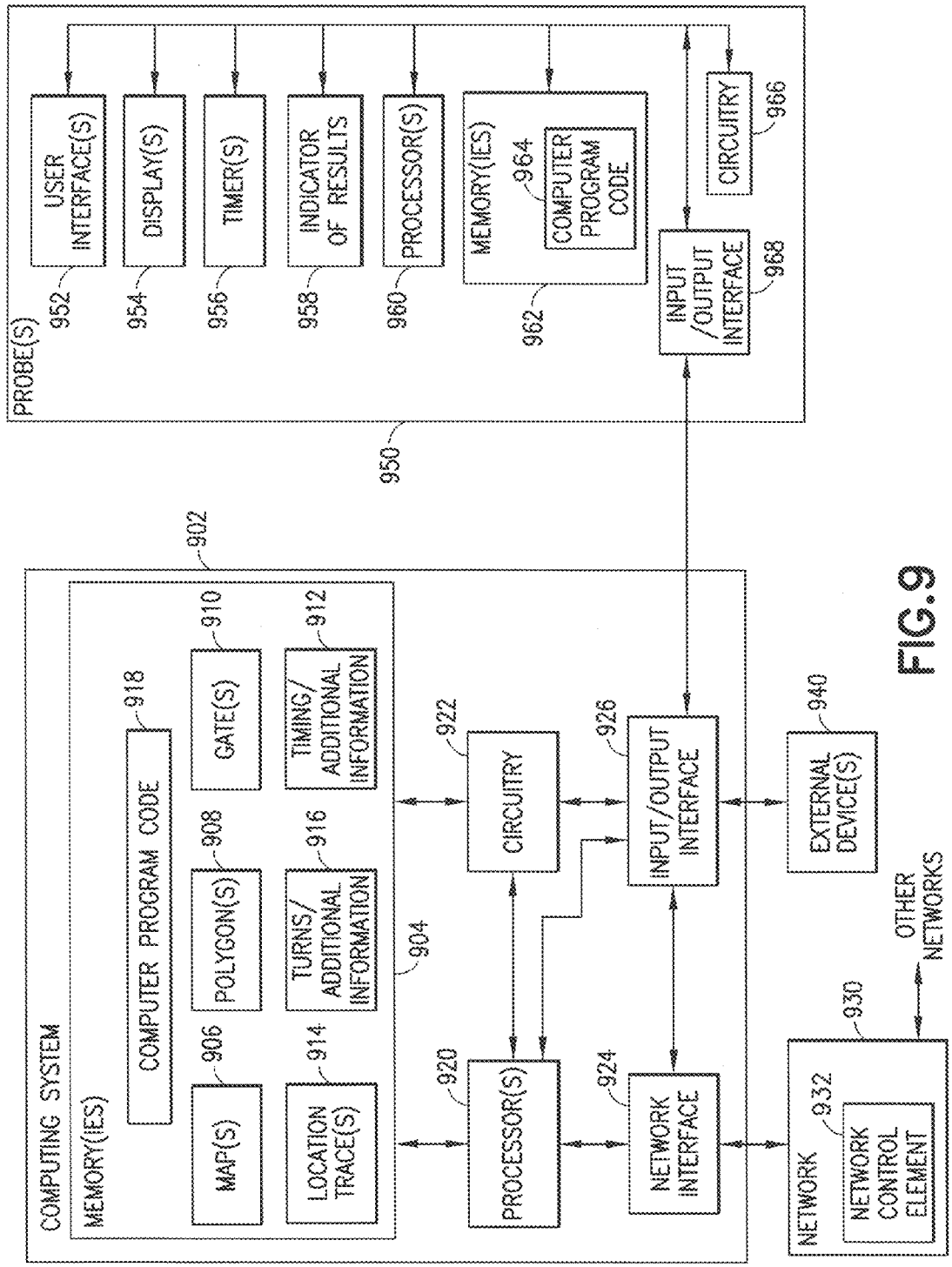
FIG. 9 is a block diagram of an exemplary logic flow diagram for the computer system, probe, and other elements, which illustrates the operation of an exemplary method, a result of execution of computer program instructions embodied on a computer readable memory, and/or functions performed by logic implemented in hardware, in accordance with exemplary embodiments herein.

FIG. 9 shows a block diagram of an exemplary system in which the exemplary embodiments may be practiced. The block diagram represents an exemplary logic flow diagram for the computer system, probe, and other elements, which illustrates the operation of an exemplary method, a result of execution of computer program instructions embodied on a computer readable memory, and/or functions performed by logic implemented in hardware, in accordance with exemplary embodiments herein. The blocks can also represent or considered to be interconnected means for performing the functions in the blocks.

In FIG. 9, a computing system 902 is in communication with a network 930 via network interface 924 and in communication with external device(s) 940 and probe(s) 950 via an input/output interface 926. The computing system 902 includes one or more processors 920, one or more memories 904, and circuitry 922, which may have one or more transceivers interconnected through one or more buses, where the one or more transceivers are connected to one or more antennas. The one or more memories 904 include computer program code 918, information concerning at least map(s) 906 with transportation structure(s), polygon(s) 908, gate(s) 910, location tracing(s) 914, turn(s) 916, and timing(s) 912 comprising entry and exit time(s) or the data points to be able to interpolate those times, turns, and tracings. The one or more memories 902 and the computer program code 918 are configured with the one or more processors 920 to cause the computer system 902 to perform one or more of the operations as described herein.

A probe 950 includes one or more processors 960, one or more memories 962, one or more interfaces 968 with the computing system and possibly one or more interfaces with the external device(s) 940, and network 930 but the probe 950 is nonetheless connected to the external devices 940 and the network 930 at least through the computing system 902.

Moreover, Probe(s) 950 may contain computing system 902 within it and/or may contain the external device(s) 940 within it. In fact any combination of the elements (computing system 902, Probe(s) 950, Network 930, and external device(s) 940) is possible. In any event, the connections between the computing system 902, Probe(s) 950, Network 930, and external device(s) 940 can be wired or wireless.

The one or more memories 962 include computer program code 964. The one or more memories 962 and the computer program code 964 are configured with the one or more processors 960 to cause the Probe 950 to perform one or more of the operations as described herein.

The network 930 may include a network control element (NCE) 932 that may include functionality which provides connectivity with a further network, such as a telephone network and/or a data communications network (e.g., the Internet). The computing system is coupled via a network 930 to the NCE 932. The NCE 932 includes one or more processors, one or more memories, and one or more network interfaces, interconnected through one or more buses, where these one or more memories also include computer program code such that these one or more memories and the computer program code are configured, with the NCE's one or more processors, cause the NCE 932 to perform one or more operations.

The external devices may include connectivity elements with the computing system 902 and possibly with the network 930 and probe(s) 950 directly, too. The external device(s) are at least coupled to the network 930 via and probe(s) 950 via the computing system 902. The external device(s) include one or more processors, one or more memories, and one or more network interfaces, interconnected through one or more buses, where these one or more memories also include computer program code such that these one or more memories and the computer program code are configured, with an external device's one or more processors, cause the external device(s) to perform one or more operations.

The computer readable memories 904, 962, and those in the NCE and external devices may be of any type suitable to the local technical environment and may be implemented using any suitable data storage technology, such as semiconductor based memory devices, flash memory, magnetic memory devices and systems, optical memory devices and systems, fixed memory and removable memory. The processors 920, 960, and those in the NCE and external devices may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the probe 950 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

An exemplary embodiment of the invention is a method comprising: enclosing a representation of a transportation structure with a bounding polygon; specifying a plurality of gates, wherein a gate comprises one or more edges of the bounding polygon that represent a legitimate entry point or exit point of the transportation structure; and computing a travel time for a probe traveling through the bounding polygon via the gates.

A further aspect of the exemplary method would be wherein the computing comprises: generating a location trace of movement of the probe; determining an entry time when the probe passes an entry point, wherein the entry point is a first intersection point between the location trace and a first gate; determining an exit time when the probe passes an exit point, wherein the exit point is a second intersection point between the location trace and a second gate; and calculating the travel time of the probe which is the difference between the exit time and the entry time.

A further aspect of the exemplary method would be where the first intersection point is established by interpolation, the second intersection point is established by interpolation, or both points are established by interpolation.

A further aspect of the exemplary method would be the method further comprising averaging a set of travel times.

A further aspect of the exemplary method would be where the set comprises only those travel times wherein the entry and exit point can be determined.

A further aspect of the exemplary method would be where the set is restricted to only travel times using a preselected first gate and a preselected second gate.

A further aspect of the exemplary method would be where the transportation structure is defined as an intersection.

A further aspect of the exemplary method would be where the bounding polygon has an outer boundary and an inner boundary.

An exemplary embodiment of the invention is an apparatus comprising at least one processor and at least one memory including computer program code, wherein the at least one memory and the computer code are configured, with the at least one processor, to cause the apparatus to at least perform the following enclosing a representation of a transportation structure with a bounding polygon; specifying a plurality of gates, wherein a gate comprises one or more edges of the bounding polygon that represent a legitimate entry point or exit point of the transportation structure; and computing a travel time for a probe traveling through the bounding polygon via the gates.

A further aspect of the exemplary apparatus would be where the computing comprises generating a location trace of movement of the probe; determining an entry time when the probe passes an entry point, wherein the entry point is a first intersection point between the location trace and a first gate; determining an exit time when the probe passes an exit point, wherein the exit point is a second intersection point between the location trace and a second gate; and calculating the travel time of the probe which is the difference between the exit time and the entry time.

A further aspect of the exemplary apparatus would be where the first intersection point is established by interpolation, the second intersection point is established by interpolation, or both points are established by interpolation.

A further aspect of the exemplary apparatus would be where the at least one memory and the computer code are further configured, with the at least one processor, to cause the apparatus to at least perform averaging a set of travel times.

A further aspect of the exemplary apparatus would be where the set comprises only those travel times where the entry point and the exit point can be determined.

A further aspect of the exemplary apparatus would be where the first gate and the second gate are preselected.

A further aspect of the exemplary apparatus would be where the transportation structure is defined as an intersection.

A further aspect of the exemplary apparatus would be where the bounding polygon has an outer boundary and an inner boundary.

A further aspect of the exemplary apparatus would be where the apparatus further comprises the probe.

An exemplary embodiment of the invention is a computer program product embodied on a non-transitory computer-readable medium in which a computer program is stored that, when being executed by a computer, is configured to provide instructions to control or carry out: enclosing a representation of a transportation structure with a bounding polygon; specifying a plurality of gates, wherein a gate comprises one or more edges of the bounding polygon that represent a legitimate entry point or exit point of the transportation structure; and computing a travel time for a probe traveling through the bounding polygon via the gates.

An exemplary embodiment of the invention could also be a device with means for enclosing a representation of a transportation structure with a bounding polygon, means for specifying a plurality of gates, and means computing a travel time for a probe traveling through the bounding polygon via the gates, where a gate comprises one or more edges of the bounding polygon that represent a legitimate entry point or exit point of the transportation structure.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:
1. An apparatus comprising:
at least one processor and at least one memory including computer program code, wherein the at least one memory and the computer code are configured, with the at least one processor, to cause the apparatus to at least perform the following:
enclosing a representation of a transportation structure with a bounding polygon;
specifying a plurality of gates, wherein a gate comprises one or more edges of the bounding polygon that represent a legitimate entry point or exit point of the transportation structure; and
computing a travel time for a probe traveling through the bounding polygon via the gates, wherein the computing comprises:
generating a location trace of movement of the probe;
determining an entry time when the probe passes an entry point, wherein the entry point is a first intersection point between the location trace and a first gate;

determining an exit time when the probe passes an exit point, wherein the exit point is a second intersection point between the location trace and a second gate; and calculating the travel time of the probe which is the difference between the exit time and the entry time; and, wherein the first intersection point is established by interpolation, the second intersection point is established by interpolation, or both points are established by interpolation.

2. The apparatus of claim 1, wherein the at least one memory and the computer code are further configured, with the at least one processor, to cause the apparatus to at least perform the following:

averaging a set of travel times.

3. The apparatus of claim 2, wherein the set comprises only those travel times where the entry point and the exit point can be determined.

4. The apparatus of claim 1, wherein the first gate and the second gate are preselected.

5. The apparatus of claim 1, wherein the transportation structure is defined as an intersection.

6. The apparatus of claim 1, wherein the bounding polygon has an outer boundary and an inner boundary.

7. The apparatus of claim 1, wherein the apparatus further comprises the probe.

8. A computer program product embodied on a non-transitory computer-readable medium in which a computer program is stored that, when being executed by a computer, is configured to provide instructions to control or carry out:

enclosing a representation of a transportation structure with a bounding polygon;

specifying a plurality of gates, wherein a gate comprises one or more edges of the bounding polygon that represent a legitimate entry point or exit point of the transportation structure; and computing a travel time for a probe traveling through the bounding polygon via the gates, wherein the computing comprises:

generating a location trace of movement of the probe;

determining an entry time when the probe passes an entry point, wherein the entry point is a first intersection point between the location trace and a first gate;

determining an exit time when the probe passes an exit point, wherein the exit point is a second intersection point between the location trace and a second gate; and calculating the travel time of the probe which is the difference between the exit time and the entry time;

wherein the first intersection point is established by interpolation, the second intersection point is established by interpolation, or both points are established by interpolation.

* * * * *